United States Patent

Noel

[15] 3,692,077
[45] Sept. 19, 1972

[54] HAND-FED, HAND-OPERATED MUFFIN SPLITTING MACHINE

[72] Inventor: Eugene M. Noel, 42 Kingston Rd., Newton Highlands, Mass. 02161

[22] Filed: Feb. 8, 1971

[21] Appl. No.: 113,340

[52] U.S. Cl. ............................................146/72
[51] Int. Cl. ............................B26f 1/24, B26d 1/06
[58] Field of Search.........................................146/72

[56] References Cited

UNITED STATES PATENTS 3,192,975  7/1965  Noel............................146/72

FOREIGN PATENTS OR APPLICATIONS 145,284  3/1954  Sweden......................146/72

*Primary Examiner*—Willie G. Abercrombie
*Attorney*—Rummler & Snow

[57] ABSTRACT

A muffin-splitting machine actuated by a link and curved lever mechanism having a handlebar for simultaneous tining of muffins from opposite sides with subsequent split of the muffin by lift of the upper half off the lower half, operated by easy down-sweep pulling motion of one hand of the operator, hand-fed by unobstructed cross-sweep of the operator's other hand, and having an adjustable cam lift so that the split of the muffins can be varied to suit particular consumer desires.

4 Claims, 5 Drawing Figures

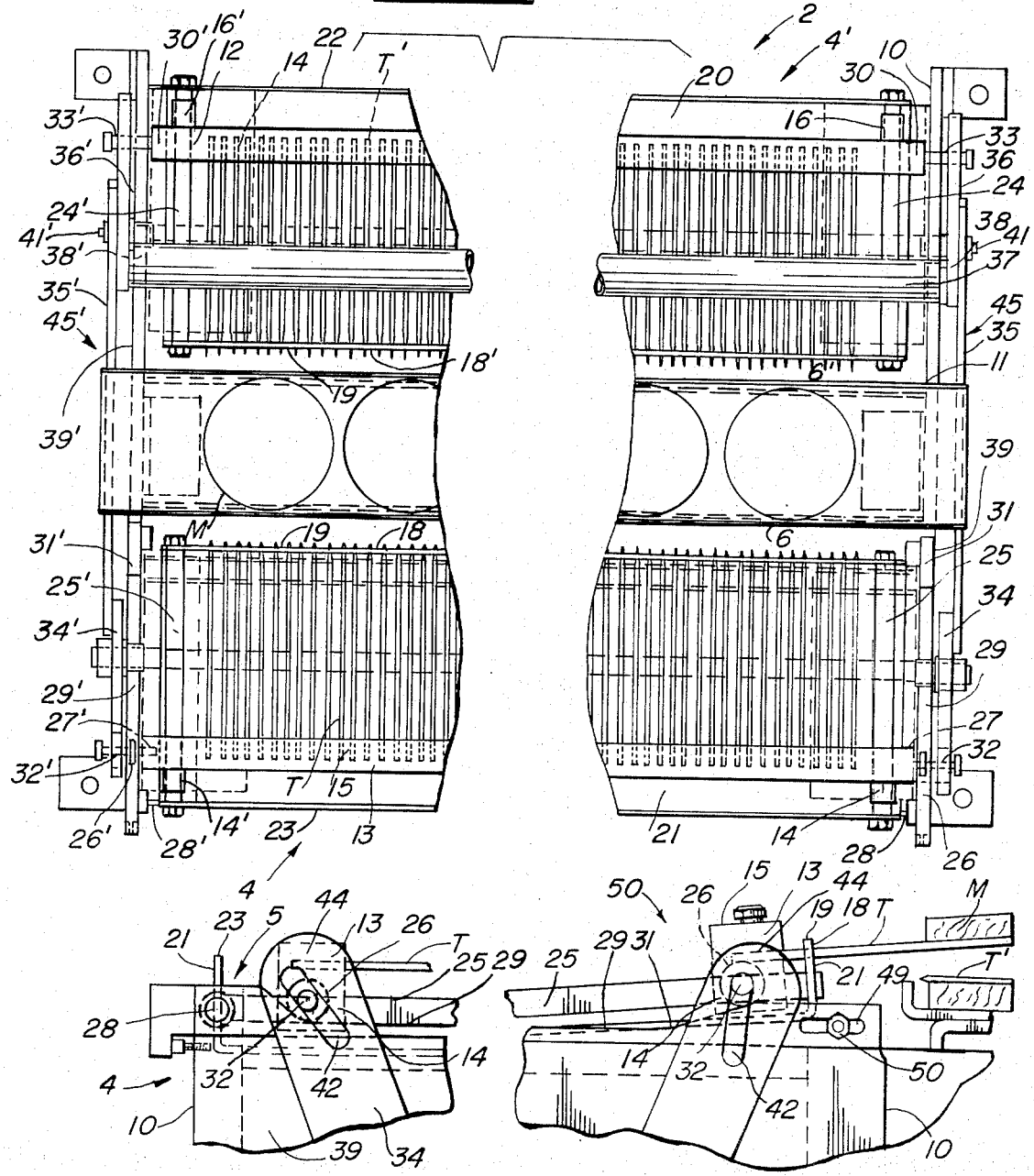

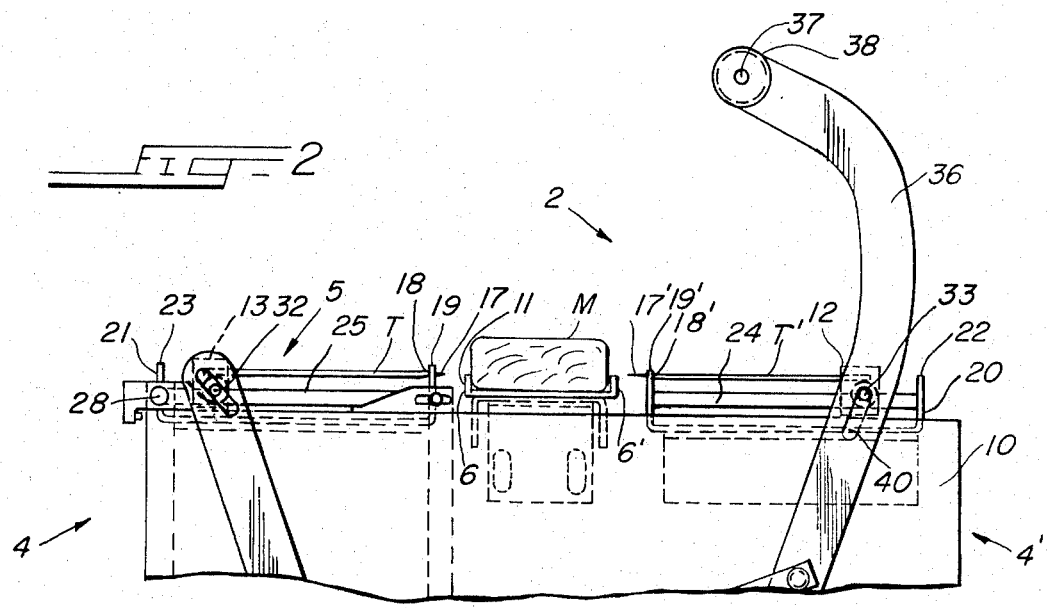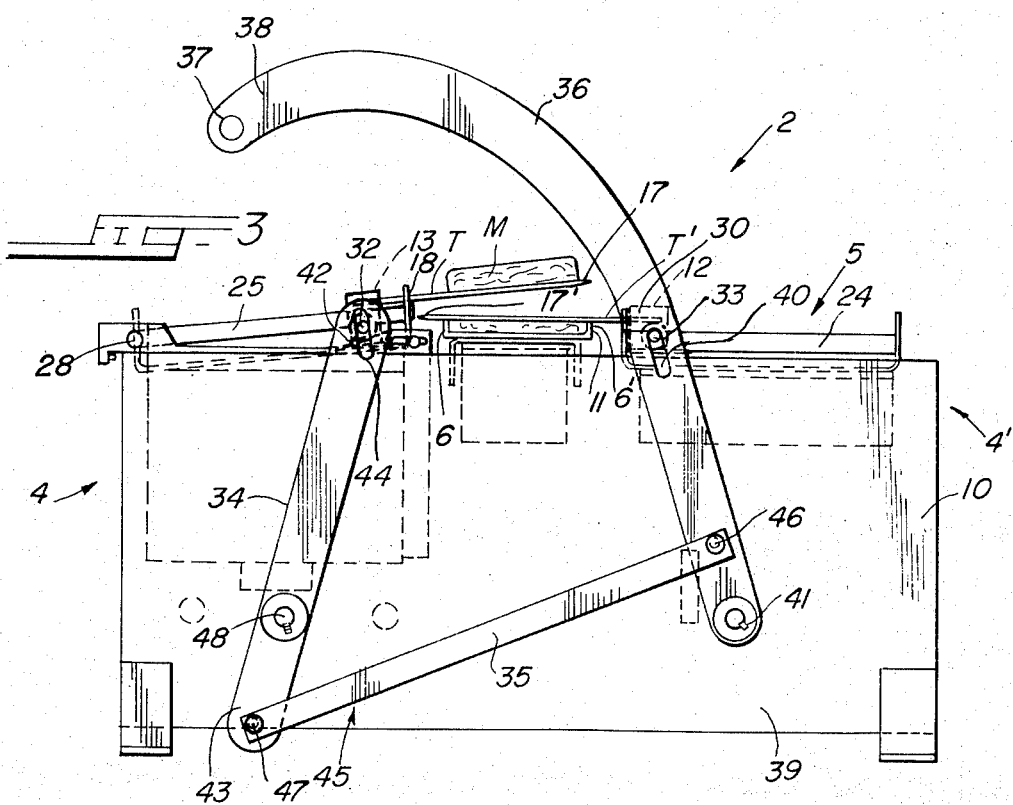

HAND-FED, HAND-OPERATED MUFFIN SPLITTING MACHINE

BACKGROUND OF THE INVENTION

This invention relates generally to the field of food making machinery, and more particularly to an improved hand-operated device suitable for the small muffin manufacturer or distributor for splitting English muffins prior to packaging for sale or serving to ultimate consumers. For an article of food to be toasted such as an English muffin, it is highly desirable that in the preparation for toasting the muffin be torn, instead of cut, to provide a rough "crumbly" surface texture which, when heated, absorbs melted butter in a superior manner, as contrasted with a smooth cut surface, resulting in a superior food item.

Unfortunately, in the state in which English muffins are generally marketed, it is difficult, if not impossible, to pull the muffins apart in an even manner. Even if the tearing is done by one who is skilled, the resulting halves of the muffin are usually unequal in thickness and are lumpy. This results in a toasted product which is charred in one part and underdone in another. By the same token, when torn in the home, the muffin very likely will not fit the conventional toaster aperture.

The upshot is that the consumer disregards the instruction to "tear" the muffin for best results, and instead cuts it with a knife, thereby losing that rough surface texture so necessary in the final development of a superior food item of this type.

Since the issue of my U.S. Pat. No. 3,192,975 on July 6, 1965, covering a fully automatic, high-rate, muffin splitting machine, the market for such special purpose equipment has broadened to include a demand for a low-cost, hand-fed, hand-operated muffin splitter having a muffin production rate of 40 to 80 muffins per minute on a continuous operating basis.

The prior art in the case of muffin splitting goes back to the Schneider Food Breaker U.S. Pat. No. 1,858,790 issued May 17, 1932, which discloses a plurality of tines arranged so that the food will present substantially no resistance to the insertion of the tines and yet are so related in position to each other as to resist movement of the food between the tines when said tines are moved angularly with respect to, or away from, the main body of the food. This device is a simple, hand-operated, one-at-a-time splitter which has very low muffin splitting rate capability.

The Jovis Muffin Tearing U.S. Pat. No. 2,840,129 issued June 24, 1958, teaches a simple one-at-a-time splitter and not a machine of the productive capability required by industry.

A Swedish Pat. No. 145,284 to Nilsson on a muffin splitter issued Mar. 18, 1954, discloses a semi-automatic, hand-fed machine for splitting muffins. The muffins are hand-fed onto a flat plate in front of a sliding frame with pointed flat knives which automatically push the muffins onto an opposing set of stationary flat knives and the cut is completed all the way through as though made by a single guillotine blade. The stationary set of knives is hinged and automatically actuated to lift the top half of the muffin off the bottom half to consummate the split. The two halves are then dumped onto a conveyor leaving the plate ready for the next hand-feeding. The Swedish patent discloses a machine which is to be distinguished from the machine of this invention as to surface texture of the split of the muffin, as well as means of operation of the machine.

The design of hand-operated processing machinery is an art in itself. For maximizing the production rate of such machinery, time and motion involved in the hand-feed operation should be coordinated with the manual splitting of the muffin and this relates to the kinematic and structural design concepts of the machine itself.

In a hand-fed, hand-operated muffin splitting machine requiring the use of both operator's hands for operation, the work of one hand must not interfere with the work of the other, and the dynamics of bodily movements involved in the feeding of the machine must be easy and quick in execution. For maximum productivity, muffin loading stations must be within easy, unobstructed reach of staging areas for muffin supply.

This invention also relates to a hand-fed, hand-operated muffin splitting machine suitable for the small muffin manufacturer or distributor who serves that discriminating muffin market which demands a muffin which can be gently opened by hand at the time of consumption in preparation for grilling or toasting.

A muffin properly perforated and split for hand-opening allows the users to gently open the muffin into two rough surface halves of equal thickness by hand. This is not possible with the non-split muffin. The rough surface of the muffin allows the high portions to carmelize or carbonize earlier and drives the heat of the toasting application into the pores and holes of the muffin making the product taste better. A sliced or cut muffin has smeared gluten on its surfaces which glazes over and is gummy underneath and does not taste as well as a properly split muffin. A muffin properly perforated and split for hand-opening has the same shelf life as a non-split muffin whereas a pre-sliced or cut muffin stales in the stores and becomes concave when it dries out, which shape is accentuated when toasted. Muffins which are properly split provide that rough "crumbly" surface which, when heated, hold and absorb butter in a superior manner, as contrasted to the glaze on a smooth cut surface, resulting in a superior food product for the discriminating market.

SUMMARY OF THE INVENTION

The gist of this invention lies in the use of a handlebar and a link and curved-lever mechanism on a hand-operated machine for splitting muffins which gives cross-sweeping accessibility to the muffin tray from the feeding end and above for quick and easy hand-feeding of the machine followed by an easy down-sweep pulling motion of the handlebar to actuate the means for splitting of the muffin. This invention provides for better, faster and more natural coordination of the physical movements of the operator's hands, arms and body than has been possible in the operation of hand-operated splitting machines of the past.

This concept here results in a split-muffin production rate averaging 40 to 80 split muffins every minute. Actual time and motion study by qualified industrial engineers has verified that the kinematics of the machine of this invention match the natural bodily movement of its operator more exactly than has been accomplished before.

Another inventive concept embodied in this machine lies in the mechanism for splitting the muffins. This mechanism incorporates two cam surfaces having ramps mounted on the frame of the machine, a first tine section having cam rollers running on the ramps lifting the first plurality of tines as full penetration of the tines in the muffins is reached, and a second tine section penetrating the muffins from the opposite side in simultaneous reciprocal cooperation therewith but not lifted as full penetration is reached, said second plurality of tines bearing an interdigitational relation with respect to the first so that there is no interference of each with the other, said first tine section lifting the top half of the muffin while the second section retains the bottom half on the muffin tray effecting the split as full penetration of the tines in the muffins is reached. This lift is adjustable so that the amount of split can be varied to suit particular consumer desires from a partially torn muffin without separation of the halves, or a muffin with complete separation of the halves, allowing the user to gently open the muffins by hand at the time of consumption ready for immediate grilling or toasting.

With the foregoing considerations in mind, it is a principal object of the invention to provide a low-cost muffin splitting machine having the muffin feeding accessibility and splitting capability for producing split muffin halves with open-textured surfaces suitable for grilling or toasting in the conventional way at a rate between 40 to 80 muffins per minute.

Another object of this invention is to provide a muffin-splitting machine that can be hand operated by easy down-sweep of one arm of the operator, and hand-fed by convenient, unobstructed cross-sweep of the other arm.

Still another object of this invention is to provide an adjustable cam lift mechanism for splitting the muffins so that the split of the muffins can be varied to permit gentle hand-breaking of the muffins at the time of consumption or to provide muffins in a pre-separated stage to suit particular consumer desires.

DESCRIPTION OF THE DRAWINGS

In order to demonstrate the invention, reference is made to the specific embodiment illustrated in the drawings, in which unprimed reference numbers refer to elements of the invention disclosed in the drawings and the primed reference numbers refer to corresponding elements of the invention which may not be disclosed in the drawings but are inherent to the invention.

FIG. 1 is a plan view, with the central portion broken away, showing the hand-operated muffin splitting machine during hand-feeding and showing the relationship of the handlebar to the side of the muffin tray toward the back of the machine whereby unobstructed accessibility to hand feed of the muffin tray from above is had;

FIG. 2 is a fragmented elevational view of the same during hand feeding showing the relationship of the handlebar mounted on the curved levers beyond the muffin tray toward the back of the machine giving the operator unobstructed accessibility to hand feed the muffin tray from either end of the machine;

FIG. 3 is an elevational view showing the relationship of handlebar and the machine during muffin splitting;

FIG. 4 is a fragmented elevational view showing the slotted lever for sliding the tine bar and tining rods toward the muffin tray for tining the muffins; and FIG. 5 is a fragmented elevational view showing the cam roller on the adjustable cam ramp for lifting the tine bar and the tines when the muffins are split.

DESCRIPTION OF THE PREFERRED EMBODIMENT

The muffin splitting machine according to the present invention is referred to in FIG. 1 generally by the reference numeral 2 and includes laterally-spaced machine ends 39–39', front side 4, back side 4' and top 5 shown in FIG. 2. An open-ended muffin tray 11 extends from end 39 to end 39' on top 5 and has a front edge 6 and a back edge 6' running parallel to front side 4 and back side 4', respectively. Front edge 6 of muffin tray 11 is bounded by first tine section T. Back edge 6' of muffin tray 11 is bounded by second tine section T'.

FIrst tine section T is comprised of a plurality of tines lying above top 5 of machine 2 positioned for transverse movement over muffin tray 11 from the front side thereof in the penetration through and the withdrawal from muffins M placed thereon. First tine section T stands withdrawn as shown in FIG. 2 while the muffins are being hand fed to the machine, with tine points 17 adjacent to the front edge 6 of muffin tray 11, permitting unobstructed placement of the muffin thereon. First tine section T stands supported by first channel 21 which lies on top 5 of machine 2 under tine section T extending from machine end 39 to machine end 39' and having front leg 23 parallel and adjacent to machine front 4 and back leg 19 parallel and adjacent to muffin tray front edge 6. Back leg 19 has a plurality of pilot holes 18 from end-to-end piloting tine points 17 in the tining of muffins M from the front. Leg 19 is tied to leg 23 adjacent ends 39 and 39', respectively, by tie rods 25 and 25'. Front leg 23 of channel 21 is pivotally mounted at pivots 28 and 28' on frame 10 at front 4 at machine ends 39 and 39' so that as back leg 19 of channel 21 is lifted about pivots 28–28', the plurality of tines in first tine section T are lifted off top 5 of frame 10.

Butt ends 15 of the plurality of tines T are supported by tine bar 13. Tine bar 13 has holes in bushings 14–14' adjacent opposite tine bar ends 27–27' slidably mounted on the bars 25–25', respectively, so that first tine section T moves slidably on the bars 25–25' for penetration and withdrawal of tines T in the tining of muffins M on tray 11 from the front. Tine bar 13 has pins 32–32' extending from opposite ends 27–27' for mounting cam rollers 26–26' thereon and for slidably engaging slots 42–42' in first levers 34–34' of over-center link-lever mechanisms 45–45'.

Opposite ends 39–39' of frame 10 have cam races 29–29' mounted thereon adjacent to first tine section T and in a direction transverse to muffin tray 11. Cam races 29–29' have flat sections and cam ramps 31–31', as shown in FIGS. 4 and 5, along which cam rollers 26–26' run so that as tine section T reaches full penetration in the tining of the muffins M, cam rollers 26–26' run up cam ramps 31–31' from the flat of cam races 29–29' lifting first tine section T and completely splitting top half of muffin M off bottom half, as shown in FIGS. 3 and 5. As is explained later, this lift is adjustable so that instead of obtaining a complete separation of the muffin halves, a partially torn muffin M is obtained allowing the user to gently open the muffins by hand at the time of consumption.

Likewise, as shown in FIGS. 1 through 3, second tine section T' is comprised of a plurality of tines lying above top 5 of machine 2 positioned for transverse movement over muffin tray 11 from the back side thereof in the penetration through and the withdrawal from muffins M placed thereon. While the top half of muffins M are being lifted by tines T in the splitting operation, tines T' with points 17' are penetrating muffins M from the back edge 6' of the muffin tray 11 and retaining the bottom half of the muffin M on tray 11. Second tine section T' stands supported by second channel 20 which lies on top 5 of machine 2 under tine section T' extending from machine end 39 to machine end 39' and having back leg 22 parallel and adjacent to machine back 4' and front leg 19' parallel and adjacent to muffin tray back edge 6'. Front leg 19' has a plurality of pilot holes 18' from end-to-end piloting tine points 17' in the tining of muffins M from the back. Leg 19' is tied to leg 22 adjacent ends 39–39' of machine 2 by tie rods 24–24'. Channel 20 is mounted on frame 10 at back edge 6' of muffin tray 11 and machine ends 39–39'. Leg 22 of channel 20 is mounted on frame 10 at back 4' of machine 2.

Butt ends 14 of the plurality of tines T' are supported by tine bar 12. Tine bar 12 has holes in bushings 16–16' adjacent opposite tine bar ends 30–30' slidably mounted on tie bars 24–24' so that second tine section T' moves slidably on tie bars 24–24' for penetration and withdrawal of tines T' in the tining of muffins M on tray 11 from the back. Tine bar 12 has pins 33–33' extending from opposite ends 30–30' for slidably engaging slots 40–40' in second levers 36–36' of over-center link-lever mechanisms 45–45'.

In the withdrawn position, the plurality of tines in the first tine section T lie in the plane of but in offset interdigitating relation with the plurality of tines in the second tine section T' so that during tining of muffins M, there is no interference therebetween. As penetration of the tines in muffins M proceeds in FIGS. 4 and 5, cam rollers 26–26' running on cam ramps 31–31' constituting upwardly inclined portions adjacent the front edge 6 of said tray 11 for engaging rollers 26–26' lift first tine section T out of the plane of interdigitation with the second tine section T' lifting the top half of the muffins M while retaining the bottom half of muffins M on muffin tray 11, thereby splitting the muffins.

The amount of muffin split to suit the desires of the particular consumer is adjustable as shown in FIG. 5, where cam ramps 31–31' are slidably adjustable lengthwise toward and away from muffin tray 11 on slots 49–49' atop frame 10 secured thereto by bolts 50–50'.

The accessibility to hand feeding and the ease of hand operation of the muffin-splitting machine 2 of this invention is apparent from a study of FIG. 1, wherein frame 10 of the machine mounts an elongated muffin tray 11, preferably of channel shape with short upstanding flanges along its front and back edges, capable of holding six muffins lined up for tining and splitting thereon. Tray 11 is disposed conveniently before and below the operator within easy arm's length reach from a muffin-staging area located adjacent ends 39 or 39' of machine 2. Handlebar 37 is located on upper ends 38–38' of second levers 36–36' above and in back of the muffin tray 11 toward the back 4' of the machine during hand feeding, having receding curvature in second levers 36–36' in a direction away from the operator in back of the muffin tray 11, as shown in FIG. 2, providing complete unobstructed muffin-feeding accessibility to the muffin tray 11 from both ends of the machine for the operator standing to the front 4 of the machine. During the tining and splitting operation, handlebar 37 is conveniently placed down and before the operator, as shown in FIG. 3.

In the muffin-splitting operation, muffins M are tined and split by the first and second tine sections T–T' traversing muffin tray 11 toward each other from opposite sides thereof in simultaneous reciprocal cooperation with the tines of one section interdigitating with those of the other section in a common plane halfway between the top and bottom sides of the muffin. As shown in FIG. 3, overcenter link-lever mechanisms 45–45' have links 35–35' with ends 46–46' pivotally connected to second levers 36–36' intermediate of slots 40–40' and lever pivot ends 41–41', respectively. Lever pivot ends 41–41' are located on frame ends 39–39' below the plane of action of first and second tine sections T–T' and to the side of muffin tray 11 toward the back 4' of the machine 2. Slots 40–40' in levers 36–36' slidably engage pins 33–33' of tine bar 12 so that a downsweep, pulling motion of handlebar 37 by the operator carries levers 36–36', slots 40–40', engaged pins 33–33' and tine bar 12 toward the front of the machine, causing the second tine section T' to penetrate into muffins M on muffin tray 11 from the back.

FIG. 3 also shows the other ends 47–47' of overcenter links 35–35' pivotally connected to first levers 34–34' at lower lever ends 43–43' thereof. Levers 34–34' have slots 42–42' in upper ends 44–44', respectively, therein slidably engaging pins 32–32' extending from ends 27–27' of tine bar 13 so that a downsweep, pulling motion of handlebar 37 by the operator carries levers 34–34', slots 42–42', engaged pins 32–32' and tine bar 13 toward the front of the machine, causing the first tine section T to penetrate muffins M on the muffin tray 11 from the front. Levers 34–34' are pivotally mounted at pivots 48–48' on frame ends 39–39', respectively, below the plane of action of first and second tine sections T–T' and to the side of muffin tray 11 toward the front 4 of the machine 2.

In the withdrawal of first and second sections of tines T–T' from muffins M, an upsweep, pushing motion of handlebar 37 by the operator standing to the front 4 of the machine causes the first and second tine sections T–T' to withdraw from muffins M in the exact reverse manner as heretofore described during the penetration operation thereof.

Although but one specific embodiment of this invention has been herein shown and described, it will be understood that the details of construction shown may be altered or omitted without departing from the spirit of the invention as defined in the appended claims.

I claim:

1. A hand-fed, hand-operated muffin splitting machine comprising:

a. a frame having a top, two ends, a front and a back;

b. a muffin tray mounted on top of said frame extending from one end of said frame to the other for hand feeding muffins to a lined up position thereon, said muffin tray having a front edge toward the front of the frame and a back edge toward the back of the frame of the machine;

c. a first tine section on top of said frame adjacent and parallel with the front edge of the muffin tray for tining of muffins on said tray from the front thereof;

d. a second time section on top of said frame adjacent and parallel with the back edge of the muffin tray for tining of muffins on the tray from the back thereof;

e. handlebar means pivotally mounted on opposite ends of and toward the back of said frame, said handlebar means overhanging the top of said frame toward the front thereof in parallel relation with the front edge of the muffin tray and being operationally connected with the first and second tine sections for causing simultaneous reciprocal interdigitating movement thereof, said handlebar means being spaced above the muffin tray to permit free access for a cross-sweeping movement of one arm of the operator for pushing a group of muffins lengthwise onto the muffin tray to load the tray followed by an alternative and non-conflicting downsweeping movement of the other arm of the operator for operating the handlebar to reciprocate the tine sections for the tining of the muffins so loaded, both arm movements being carried out in a natural sequence of bodily movements; and f. means for lifting one section of the interdigitated tines relative to the other to open tined muffins on said tray.

2. A hand-fed, hand-operated muffin splitting machine as disclosed in claim 1 wherein the means for the tining of the muffins in simultaneous reciprocal cooperation from the front and back comprises:

a. over-center link-lever mechanisms mounted on two ends of said frame and having first levers with upper and lower ends, said levers being pivotally mounted below said muffin tray toward the front of the machine and having upper ends operationally connected with the said first tining section to tine muffins from the front side thereof;

b. said over-center link-lever mechanisms having second levers with ends pivotally mounted below said muffin tray toward the back of the machine with their upper ends supporting a handlebar located above and in back of said muffin tray during hand feeding of muffins onto the tray, said second levers being curved in a direction away from the operator standing in front of the machine and downwardly in back of said muffin tray during hand feeding of muffins thereonto, said second levers being operationally connected with the second tining section intermediate their upper and pivoted ends for tining muffins from the back side thereof; and c. said over-center link-lever mechanisms each having an over-center link pivotally connected at one end to the lower end of a first lever and pivotally connected at the other end to a corresponding second lever intermediate the pivoted end and the operational connection of the lever with said second tining section.

3. A hand-fed, hand-operated muffin splitting machine as disclosed in claim 1 wherein the means for splitting said muffins comprises:

a. pins extending laterally outward from each end of said first tine section;

b. cam ramp means in the path of movement of said pins as said first tine section is moved toward said tray; and c. cam rollers mounted on said pins for engaging said cam ramp means to lift the first tine section out of the plane of interdigitation with the second tine section as full penetration of the tines into the muffins is reached.

4. A hand-fed, hand-operated muffin splitting machine as disclosed in claim 3 wherein the cam ramp means comprises cam races slidably mounted atop and along each end of said frame and having upwardly inclined portions adjacent the front edge of said tray for engaging said rollers, said cam races being adjustable lengthwise toward and away from the tray to vary the amount of lift of the first tine at full penetration of muffins on said tray.

* * * * *